(12) United States Patent
Baek et al.

(10) Patent No.: US 10,266,691 B2
(45) Date of Patent: Apr. 23, 2019

(54) CURABLE COMPOSITION

(71) Applicant: LG Chem, Ltd., Seoul (KR)

(72) Inventors: Si Yeon Baek, Daejeon (KR); Seung Min Lee, Daejeon (KR); Min Soo Park, Daejeon (KR); Se Woo Yang, Daejeon (KR); So Young Kim, Daejeon (KR)

(73) Assignee: LG Chem, Ltd. (KR)

(*) Notice: Subject to any disclaimer, the term of this patent is extended or adjusted under 35 U.S.C. 154(b) by 0 days.

(21) Appl. No.: 15/546,809

(22) PCT Filed: Feb. 22, 2017

(86) PCT No.: PCT/KR2017/001919
§ 371 (c)(1),
(2) Date: Jul. 27, 2017

(87) PCT Pub. No.: WO2017/155229
PCT Pub. Date: Sep. 14, 2017

(65) Prior Publication Data
US 2018/0273753 A1    Sep. 27, 2018

(30) Foreign Application Priority Data
Mar. 11, 2016  (KR) .................. 10-2016-0029492

(51) Int. Cl.
*C08L 83/04* (2006.01)
*C08L 75/16* (2006.01)
(Continued)

(52) U.S. Cl.
CPC ............ *C08L 75/16* (2013.01); *C08G 18/242* (2013.01); *C08G 18/348* (2013.01); *C08G 18/61* (2013.01);
(Continued)

(58) Field of Classification Search
None
See application file for complete search history.

(56) References Cited

U.S. PATENT DOCUMENTS 4,130,708 A * 12/1978 Friedlander ............ C08G 18/61
522/172
4,684,538 A *  8/1987 Klemarczyk .......... C08G 18/61
427/515
(Continued)

FOREIGN PATENT DOCUMENTS

CN       103555192 A     2/2014
EP       0239228 A2      9/1987
(Continued)

OTHER PUBLICATIONS

Extended European Search Report for Application No. EP17754247 dated Apr. 13, 2018.
(Continued)

*Primary Examiner* — Robert S Loewe
(74) *Attorney, Agent, or Firm* — Lerner, David, Littenberg, Krumholz & Mentlik, LLP

(57) ABSTRACT

The present application relates to a curable composition and a use thereof. The present application can provide a curable composition having excellent transparency, heat resistance and adhesion. Such a curable composition can be usefully used in direct bonding between a filler and an optical member of a display device.

13 Claims, 1 Drawing Sheet

(51) Int. Cl.
*C08G 18/61* (2006.01)
*C08L 83/06* (2006.01)
*C08G 18/24* (2006.01)
*C08G 18/34* (2006.01)
*C08G 18/65* (2006.01)
*C08G 18/75* (2006.01)

(52) U.S. Cl.
CPC ....... *C08G 18/6541* (2013.01); *C08G 18/755* (2013.01); *C08L 83/04* (2013.01); *C08L 83/06* (2013.01)

(56) References Cited

U.S. PATENT DOCUMENTS

| | | | | | |
|---|---|---|---|---|---|
| 5,237,082 | A | * | 8/1993 | Leir | C07F 7/12 556/413 |
| 5,264,278 | A | * | 11/1993 | Mazurek | C09J 4/06 428/317.3 |
| 5,426,132 | A | * | 6/1995 | Gaglani | C08F 30/08 522/148 |
| 5,514,730 | A | * | 5/1996 | Mazurek | C09J 4/06 522/99 |
| 6,310,169 | B1 | * | 10/2001 | Kawabata | C08G 77/38 525/474 |
| 6,524,564 | B1 | * | 2/2003 | Kim | A61K 8/87 424/401 |
| 7,862,898 | B2 | * | 1/2011 | Sherman | C09J 183/04 428/447 |
| 8,642,712 | B2 | * | 2/2014 | Chang | C08F 230/08 526/279 |
| 2004/0167296 | A1 | * | 8/2004 | Klee | A61K 6/083 525/474 |
| 2012/0230892 | A1 | * | 9/2012 | Peterson | B01L 3/50853 422/552 |
| 2014/0018495 | A1 | | 1/2014 | Saitou | |

FOREIGN PATENT DOCUMENTS

| | | | |
|---|---|---|---|
| EP | 3127931 | A1 | 2/2017 |
| JP | 2000351817 | A * | 12/2000 ............ C08F 290/06 |
| JP | 2005-055641 | A | 3/2005 |
| JP | 2012144670 | A * | 8/2012 ............ C08F 299/06 |
| JP | 2015199908 | A | 11/2015 |
| KR | 20130112488 | | 10/2013 |
| KR | 20140095573 | A | 8/2014 |
| TW | 201418021 | A | 5/2014 |
| TW | 201542602 | A | 11/2015 |
| WO | 2013048615 | A1 | 4/2013 |
| WO | 2015152110 | A1 | 10/2015 |

OTHER PUBLICATIONS

Search report from Taiwan Application No. 10621078290 dated Oct. 20, 2017.

Search Report from International Application No. PCT/KR2017/001919, dated May 24, 2017.

* cited by examiner

[Figure 1]
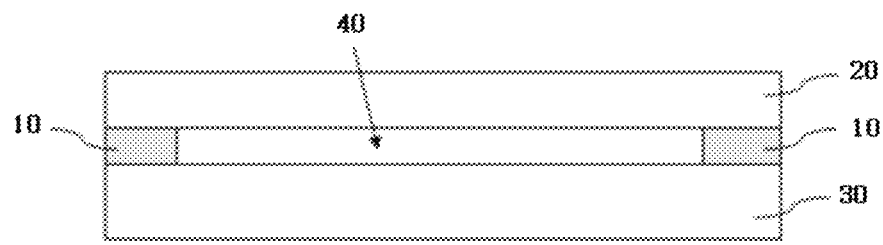
[Figure 2]
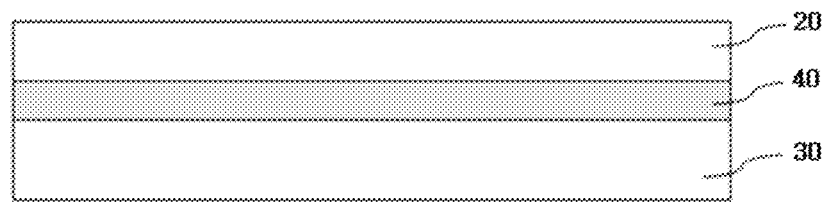

CURABLE COMPOSITION

CROSS-REFERENCE TO RELATED APPLICATION

The application is a national phase entry under 35 U.S.C. § 371 of International Application No. PCT/KR2017/001919, filed Feb. 22, 2017, which claims priority to Korean Patent Application No. 10-2016-0029492, filed Mar. 11, 2016, the disclosures of which are incorporated herein by reference.

TECHNICAL FIELD

The present application relates to a curable composition and a use thereof.

BACKGROUND ART

As disclosed in Patent Document 1 (Japanese Unexamined Patent Publication No. 2005-55641), fillers for electronic devices can fill air gaps of display devices to improve visibility and durability and reduce thickness. The properties required for these fillers include heat resistance, adhesion, transparency, and the like, and recently the demand for high heat resistance is increasing.

As fillers, acrylic fillers and silicone fillers are widely used. Conventionally, acrylic fillers have an excellent adhesion and are low in cost, but there is a disadvantage that durability is deteriorated at high temperature and low temperature. Conventionally, silicone fillers have excellent heat resistance and chemical resistance, but there is a disadvantage that adhesion is deteriorated, tensile strength is weak, and the price is high. Therefore, it is necessary to develop fillers having excellent heat resistance and adhesion together.

DETAILED DESCRIPTION OF THE INVENTION

Technical Problem

It is a problem of the present invention to provide a curable composition having excellent transparency, heat resistance and adhesion, and a use thereof.

Technical Solution

The present application relates to a curable composition. An exemplary curable composition can comprise a polysiloxane-based urethane (meth) acrylate and a non-reactive oligomer. The non-reactive oligomer may be a non-reactive silicone oligomer or a non-reactive silicone modified urethane oligomer. The polysiloxane-based urethane (meth) acrylate may be a curing component, and the non-reactive oligomer may be a diluent component. Such a curable composition can be advantageously used as a filler for a display device because it has excellent transparency, heat resistance and adhesion. Hereinafter, the curable composition of the present application will be specifically described.

The curable composition may comprise 20 to 70 parts by weight of a polysiloxane-based urethane (meth) acrylate and 30 to 70 parts by weight of a non-reactive oligomer. When components and contents of the curable composition satisfy the above, the modulus, heat resistance, adhesion and cohesion required for a filler for a display device can be suitably realized.

The polysiloxane-based urethane (meth) acrylate may comprise a polysiloxane backbone and comprise one or more (meth) acryl groups at the ends through urethane bonding. In the present specification, the (meth) acrylate may mean acrylate or methacrylate, and the (meth) acryl group may mean an acryl group or a methacryl group. The polysiloxane may be, for example, polydialkylsiloxane, more specifically polydimethylsiloxane.

The polysiloxane-based urethane (meth) acrylate may be a urethane reactant of a hydroxyl group-containing polysiloxane, a polyfunctional isocyanate and a hydroxyl group-containing (meth) acrylate. In the present specification, the hydroxyl group-containing compound may mean a compound having a hydroxyl group at the end.

The hydroxyl group-containing polysiloxane may have at least one hydroxyl group at the end. The hydroxyl group-containing polysiloxane may be, for example, a compound represented by Formula 1 below.

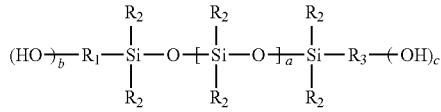

[Formula 1]

In Formula 1, $R_1$ and $R_3$ are each independently a hydrocarbon group or an organic group containing a hetero atom or an ether group, each of $R_2$ is independently an alkyl group, a cycloalkyl group or a phenyl group, a is an integer of 10 or more, b and c are each independently an integer of 0 to 3, provided that the sum of b and c is 1 or more.

The hydrocarbon group may be, for example, a hydrocarbon group having 1 to 100 carbon atoms, specifically, 1 to 25 carbon atoms, more specifically, 1 to 5 carbon atoms, and may be a divalent or trivalent hydrocarbon group. As the divalent hydrocarbon group, for example, an alkylene group can be exemplified. The number of carbon atoms of the alkylene group is preferably 1 to 10, particularly preferably 1 to 4, and for example, an ethylene group, a propylene group, and a tetramethylene group, and the like can be exemplified.

As the organic group containing a hetero atom, for example, an oxyalkylene group, a polyoxyalkylene group, a polycaprolactone group, an amino group and the like can be exemplified.

As the organic group containing an ether group, an ethyl ether group and the like can be exemplified.

In Formula 1, each of $R_2$ may be independently an alkyl group, a cycloalkyl group, or a phenyl group. The alkyl group may be, for example, an alkyl group having 1 to 15 carbon atoms, specifically 1 to 10 carbon atoms, more specifically 1 to 4 carbon atoms, and for example is preferably a methyl group, an ethyl group, a propyl group, and the like, and particularly preferably a methyl group.

The cycloalkyl group may be, for example, a cycloalkyl group having 3 to 10 carbon atoms, specifically 5 to 8 carbon atoms, and for example, a cyclopentyl group, a cyclohexyl group, and a norbornyl group, and the like can be exemplified.

In addition, the alkyl group, cycloalkyl group and phenyl group above may also have a substituent. The substituent may include, for example, a halogen atom, a hydroxyl group, an alkoxy group, an amino group, a mercapto group, a sulfanyl group, a vinyl group, an acryloxy group, a methacryloxy group, an aryl group and a heteroaryl group, and the like.

In Formula 1, a may be an integer of 10 or more, specifically 30 to 200, more specifically 40 to 120. b and c are each independently an integer of 0 to 3, provided that the sum of b and c may be 1 or more, and for example, b and c may be 1, respectively.

As the hydroxyl group-containing polysiloxane, it is, specifically, a compound having a hydroxyl group at the end of polysiloxane such as polydimethylsiloxane, polydiethylsiloxane and polymethylphenylsiloxane, and for example, polydimethylsiloxane having a hydroxyl group at the end may be used. As the polydimethylsiloxane having a hydroxyl group at the end, for example, polydimethylsiloxane monool having one hydroxyl group at one end, polydimethylsiloxane diol having two hydroxyl groups at one end, and polydimethylsiloxane diol having the hydroxyl group by one at both ends and the like can be exemplified.

Specifically, as the polydimethylsiloxane monool having one hydroxyl group at one end, X-22-4015 (manufactured by Shin-Etsu Chemical Industry Co., Ltd.), Silaplane FM-0411, FM-0412 and FM-0425 (manufactured by Chisso Corporation) can be exemplified, as the polydimethylsiloxane diol having two hydroxyl groups at one end, Silaplane FM-DA11, FM-DA12 and FM-DA25 (manufactured by Chisso Corporation) can be exemplified, and as the polydimethylsiloxane diol having the hydroxyl group by one at both end, X-22-160 AS, KF-6001, KF-6002, KF-6003 (manufactured by Shin-Etsu Chemical Industry Co., Ltd.), Silaplane FM-4411, FM-4412 and FM-4425 (manufactured by Chisso Corporation) and Macromonomer-HK-20 (manufactured by Dong A Synthetic Co., Ltd.), and the like can be exemplified.

As the polyfunctional isocyanate, a compound having at least two isocyanate groups may be used. Specifically, as the polyfunctional isocyanate, diisocyantes such as hexamethylene diisocyanate [HDI], isophorone diisocyanate [IPDI], methylene bis(4-cyclohexyl isocyanate) [H12MDI], trimethylhexamethylene diisocyanate [TMHMDI], tolylene diisocyanate [TDI], 4,4-diphenylmethane diisocyanate [MDI] and xylene diisocyanate [XDI], and the like can be exemplified. In addition, an adduct in which diisocyanate is modified with trimethylolpropane, a trimer (isocyanurate) of diisocyanate, a burette by a reaction diisocyanate with water, or the like can be used alone or in combination of two or more.

As the hydroxyl group-containing (meth) acrylate, hydroxyalkyl (meth) acrylate can be used. As the hydroxyl group-containing (meth) acrylate, for example, 2-hydroxyalkyl (meth) acrylate such as 2-hydroxyethyl (meth) acrylate, 2-hydroxypropyl (meth) acrylate, 2-hydroxybutyl (meth) acrylate, 4-hydroxybutyl (meth) acrylate and 6-hydroxyhexyl (meth) acrylate, 2-hydroxyethyl acryloylphosphate, 2-(meth) acryloyloxyethyl-2-hydroxypropyl phthalate, caprolactone modified 2-hydroxyethyl (meth) acrylate, dipropylene glycol (meth) acrylate, fatty acid modified glycidyl (meth) acrylate, polyethylene glycol mono (meth) acrylate, polyethyleneglycol mono (meth) acrylate, polypropyleneglycol mono (meth) acrylate, 2-hydroxy-3-(meth) acryloyloxypropyl (meth) acrylate, glycerin di(meth) acrylate, 2-hydroxy-3-acryloyloxypropyl methacrylate, pentaerythritol tri (meth) acrylate, caprolactone modified pentaerythritol tri (meth) acrylate, ethylene oxide modified pentaerythritol tri (meth) acrylate, dipentaerythritol penta (meth) acrylate, caprolactone modified dipentaerythritol penta (meth) acrylate and ethylene oxide modified dipentaerythritol penta (meth) acrylate, and the like can be exemplified, and these may be used alone or in a mixture of two or more.

The polysiloxane-based urethane (meth) acrylate may have at least one, specifically 1 to 4, more specifically 1, 2 or 3 (meth) acryl groups at the end. In the present specification, a compound having n (meth) acryl groups at the end may be referred to as an n-functional compound.

The polysiloxane-based urethane (meth) acrylate may be also, as a curing component, only a polysiloxane-based urethane (meth) acrylate having a specific number of (meth) acryl groups, or a mixture of polysiloxane-based urethane (meth) acrylates having different numbers of (meth) acryl groups.

In one example, the polysiloxane-based urethane (meth) acrylate may comprise a bifunctional polysiloxane-based urethane (meth) acrylate. When the curable composition comprises the bifunctional polysiloxane-based urethane (meth) acrylate as the curing component, it can be advantageous to exhibit high heat resistance performance because it can achieve a crosslinking structure of a certain level or more. The curing component may further comprise a monofunctional polysiloxane-based urethane (meth) acrylate or trifunctional polysiloxane-based urethane (meth) acrylate. When the curing component is a mixture of monofunctional and bifunctional polysiloxane-based urethane (meth) acrylates, the monofunctional acrylate may be included in a proportion of 20 to 500 parts by weight or less relative to 100 parts by weight of the bifunctional acrylate. When the curing component is a mixture of bifunctional and trifunctional polysiloxane-based urethane (meth) acrylates, the trifunctional acrylate may be included in a proportion of 2 to 50 parts by weight relative to 100 parts by weight of the bifunctional acrylate.

The polysiloxane-based urethane (meth) acrylate may have a weight average molecular weight of, for example, 10,000 to 100,000, specifically 10,000 to 80,000, more specifically 10,000 to 70,000. If the weight average molecular weight of the polysiloxane-based urethane (meth) acrylate satisfies the above range, the curable composition having excellent transparency, heat resistance and adhesion may be provided. In the present specification, the weight average molecular weight may mean a value in terms of standard polystyrene measured by a gel permeation chromatography (GPC) method.

The non-reactive oligomer may be a non-reactive silicone oligomer or a non-reactive silicone modified urethane oligomer. The non-reactive oligomer may be a compound having no (meth) acryl group. When the curable composition uses the non-reactive oligomer as a diluent, the heat resistance may be further improved by minimizing the (meth) acryl group in the heat resistance improving system and inhibiting a decomposition reaction of the ester group by heat.

The non-reactive silicone oligomer may be, for example, a compound represented by Formula 2 below.

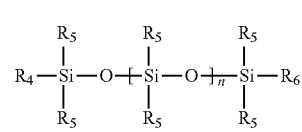

[Formula 2]

In Formula 2, $R_4$ and $R_6$ are each independently a hydrocarbon group or an organic group containing a hetero atom, an ether group or a hydroxyl group, each of $R_5$ is independently an alkyl group, a cycloalkyl group or a phenyl group, and n is an integer of 10 or more.

As the non-reactive silicone oligomer, for example, a silicone oil or silicone fluid product such as FM-0411, FM-0421, FM-0425, FMDA11, FM-DA21, FM-DA26, FM-4411, FM-4421, FM-4425 (Chisso), DMS-T00, DMS-T01, DMS-T02, DMS-T03, DMS-T05, DMS-T07, DMS-T11, DMS-T 12, DMS-T 15, DMS-T 21, DMS-T 22, 23, DMS-T25, DMS-T31, DMS-T 35, DMS-T 41, DMS-T 43, DMS-T 46, DMS-T 51, DMS-T53, DMS-T 56, PDM-0421, PDM-0821, PDM-1922, PMM-1015, PMM-1025, PMM-1043, PMM-5021, PMM-0011, PMM-0021, PMM-0025 (Gelest), X-22-4039, X-22-4015, KF-99, KF-9901, KF-6000, KF-6001, KF-6002. KF-6003, KF-6004, X-22-4952, X-22-4272, KF-6123, X-21-5841, KF-9701, X-22-170BX, X-22-170DX, X-22-176DX, X-22-176F, X-22-176GX-A, KF-6011, KF-6012, KF-6015 and KF-6017 (Shinetsu) can be used.

The non-reactive silicone modified urethane oligomer may comprise, for example, a polysiloxane backbone and may have at least one hydroxyl group or alkyl group at the end through urethane bonding.

As one example, the non-reactive silicone modified urethane oligomer may be a urethane reactant of a hydroxyl group-containing polysiloxane, a polyfunctional isocyanate and a monomer containing an alkyl group, an ether group or a hydroxyl group.

As one specific example, the hydroxyl group-containing polysiloxane may be a compound represented by Formula 1 below.

[Formula 1]

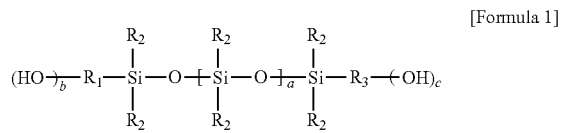

In Formula 1, $R_1$ and $R_3$ are each independently a hydrocarbon group or an organic group containing a hetero atom or an ether group, each of $R_2$ is independently an alkyl group, a cycloalkyl group or a phenyl group, a is an integer of 10 or more, b and c are each independently an integer of 0 to 3, provided that the sum of b and c is 1 or more.

The specific details of Formula 1 above may be applied the same by the contents described for Formula 1 in the polysiloxane-based urethane (meth) acrylate item. The specific details of the polyfunctional isocyanate may be applied the same by the contents described for the polyfunctional isocyanate in the polysiloxane-based urethane (meth) acrylate item. The monomer containing the alkyl group, ether group or hydroxyl group above may be, for example, a monomer containing a methyl group, an ethyl group, a propyl group, a butyl group, a methoxy group, an ethoxy group or a hydroxyl group.

The non-reactive oligomer may have a weight average molecular weight (Mw) of 10,000 to 50,000. When the weight average molecular weight of the non-reactive oligomer satisfies the above range, the curable composition having excellent transparency, heat resistance and adhesion can be provided.

The curable composition may further comprise an initiator. As the initiator, a photopolymerization initiator or a thermal polymerization initiator can be used. In one example, as the initiator, a photopolymerization initiator may be used, and for example, an ultraviolet polymerization initiator or a visible light polymerization initiator may be used. As the ultraviolet polymerization initiator, for example, benzoins, benzophenones, acetophenones, and the like may be used. As the visible light polymerization initiator, for example, acylphosphine oxides, thioxanthones, metallocenes, quinones, α-aminoalkylphenones, and the like may be used, without being limited thereto. The initiator may be contained in a proportion of 1 to 10 parts by weight relative to 100 parts by weight of the curable composition, but this may be suitably adjusted as needed.

The curable composition may further comprise a silane coupling agent. The silane coupling agent may improve adhesiveness and adhesion stability to improve heat resistance and moisture resistance, and serve to improve adhesion reliability even when left in a severe condition for a long time. As the silane coupling agent, for example, γ-glycidoxypropyl triethoxysilane, γ-glycidoxypropyl trimethoxysilane, γ-glycidoxypropylmethyl diethoxysilane, γ-glycidoxypropyl triethoxysilane, 3-mercaptopropyl trimethoxysilane, vinyl trimethoxysilane, vinyl trimethoxysilane, γ-methacryloxypropyl trimethoxysilane, γ-methacryloxypropyl triethoxysilane, γ-aminopropyl trimethoxysilane or γ-aminopropyl triethoxysilane and the like can be used, and the foregoing can be used alone or in a mixture of two or more. The silane coupling agent may be contained in a proportion of 1 to 10 parts by weight relative to 100 parts by weight of the curable composition, but this can be appropriately adjusted as needed.

The curable composition may further comprise an antioxidant. The antioxidant may be contained in a proportion of 0.01 to 5 parts by weight, and more specifically, in a proportion of 0.01 to 3 parts by weight, relative to 100 parts by weight of the curable composition, but this may be suitably adjusted as needed.

In addition to these, the curable composition may further comprise known additives such as an elastomer, a curing agent, a plasticizer, a filler, a colorant, a UV stabilizer, a toning agent, a reinforcing agent, a defoamer, a surfactant or an antirust agent depending on the intended use.

The curable composition after curing may have an elastic modulus at 1 Hz of 10,000 Pa to 100,000 Pa, specifically 10,000 Pa to 80,000 Pa or 10,000 Pa to 60,000 Pa, and more specifically 10,000 Pa to 40,000 Pa. The elastic modulus can be measured by Measurement Example 1 (Modulus Measurement) to be described below. When the elastic modulus of the curable composition is in the above range, physical properties suitable for use as a filler for a display device can be realized.

The curable composition may have a viscosity at 1 Hz and 25° C. of 1,000 cp to 10,000 cp. Specifically, the curable composition may have a viscosity at 1 Hz and 25° C. of 3,000 cp to 6,000 cp. The viscosity can be measured by Measurement Example 2 (Viscosity Measurement) to be described below. When the viscosity of the curable composition is in the above range, physical properties suitable for use as a filler for a display device can be realized.

The curable composition after curing may have an elongation of 100% to 500%. The elongation can be measured by Measurement Example 3 (Elongation Measurement) to be described below. When the elongation of the curable composition is in the above range, physical properties suitable for use as a filler for a display device can be realized. The curable composition after curing may have a shear strength of 20 N/cm$^2$ or more. The shear strength can be measured by Measurement Example 4 (Shear Strength Measurement) to be described below. When the shear strength of the curable composition is in the above range, physical properties suitable for use as a filler for a display device can be realized.

The curable composition after curing may have a haze of 1% or less, specifically 0.5% or less. The haze can be measured by Measurement Example 5 (Haze Measurement) to be described below. When the haze of the curable composition is in the above range, it means that transparency is excellent, and thus the composition is more suitable for use as a filler for a display device.

The curable composition after curing and storage at 105° C. for 1000 hours may have a yellow index (Y.I) value of 2.0 or less. The Y.I value can be measured by Measurement Example 6 (Y.I Measurement) to be described below. When the Y.I value of the curable composition is in the above range, it means that high temperature durability is excellent, and thus the composition is suitable for use as a filler for a display device.

The present application also relates to a use of the curable composition. As one example, the present application relates to a filler comprising a cured product of the curable composition. The curable composition has excellent transparency, heat resistance and adhesion, and thus can be usefully used as a filler for display devices.

The cured product herein may mean a material in a cured state. Also, curing herein may mean a process in which the composition exhibits adhesion or pressure-sensitive adhesion through physical or chemical action or reaction of components contained in the composition.

The curing of the curable composition can be performed by a process of maintaining the composition at an appropriate temperature so that the curing of the curable component can proceed or a process of being irradiated with an appropriate active energy ray. When the maintenance at an appropriate temperature and the irradiation of the active energy ray are simultaneously required, the above processes can be carried out sequentially or simultaneously. The irradiation of the active energy ray may be performed using, for example, a high-pressure mercury lamp, a non-electrode lamp or a xenon lamp, and the like, and the conditions, such as wavelength or light intensity of the active energy ray to be irradiated, may be selected within a range in which curing can be appropriately performed.

In one example, the curing of the curable composition can be carried out by being irradiated with ultraviolet of a wavelength band of about 150 nm to 450 nm at a light intensity of 1000 $mJ/cm^2$ to 6000 $mJ/cm_2$, but this can be suitably adjusted as needed.

In addition, the thickness of the curable composition after curing, that is, the thickness of the cured product may be 10 μm to 500 μm, specifically, 100 μm to 300 μm, which may be appropriately adjusted as needed.

The present application relates to a display device comprising at least one air gap between optical elements and comprising a cured product of the curable composition to fill the air gap. FIG. 1 exemplarily shows the display device. As exemplarily shown in FIG. 1, the display device exemplarily shows for the cured product (40) of the curable composition to be filled in a space between a touch panel (20) and a display panel (30), spaced apart by a spacer (10), a so-called air gap.

However, the structure and position of the air gap are not limited to those shown in FIG. 1, and the curable composition can be used as uses for filling air gaps in various structures and positions of the optical member constituting the display device.

As the display device, for example, a liquid crystal display device, an organic electroluminescence device, a plasma display, and the like can be exemplified, but it is not limited thereto.

As another example, the curable composition may be also usefully used in direct bonding between optical members constituting a display device. As exemplarily shown in FIG. 2, in a display device comprising a touch panel (20) and a display panel (30), the device exemplarily shows for the cured product (40) of the curable composition to directly bond the touch panel and the display panel.

As another example, the curable composition may be also usefully used in direct bonding between display devices and other optical functional members. An example of the optical function member may include a transparent plastic plate such as an acrylic plate (for example, a hard coating or an antireflection coating may be processed on one side or both sides), a PC (polycarbonate) plate, a PET (polyethylene terephthalate) plate and a PEN (polyethylene naphthalate) plate, a tempered glass (for example, a scattering prevention film may be also attached), or a touch panel input sensor, for the purpose of improving visibility and preventing breakage of the display device from external impact.

When the cured product of the curable composition is applied to the display device, the other components constituting the display device and the constituting method of the device are not particularly limited, and as long as the cured product is used, any material or method known in the relevant field can be employed.

Effects of the Invention

The present application can provide a curable composition having excellent transparency, heat resistance and adhesion. Such a curable composition can be usefully used in direct bonding between fillers and optical members of display devices.

BRIEF DESCRIPTION OF DRAWINGS

FIGS. 1 and 2 exemplarily show display devices to which a cured product of the curable composition of the present application is applied.

MODE FOR THE INVENTION

Hereinafter, the curable composition of the present application will be described in more detail through Examples and Comparative Examples, but the scope of the present application is not limited by Examples as set forth below. In addition, the physical properties and characteristics of Examples and Comparative Examples are measured as follows.

Measurement Example 1: Modulus Measurement

The curable compositions of Examples and Comparative Examples were applied between the release-treated films, and then irradiated with ultraviolet having a wavelength band of 150 nm to 450 nm at a light intensity of about 4000 $mJ/cm^2$ using a metal halide UV lamp (D-bulb) and cured so as to have a thickness of 1 mm after curing. The cured products were tailored to prepare circular samples having a diameter of 8 mm and a thickness of 1 mm, and then storage elastic modulus (G') at 1 Hz was measured using an ARES-G2 Rheometer from TA instruments.

Measuring temperature: 25° C.
Measuring strain: 5%,
Measurement mode: frequency sweep mode Measurement Example 2: Viscosity Measurement For the curable compositions of Examples and Comparative Examples, viscosity at 1 Hz was measured using an ARES-G2 Rheometer from TA instruments.

Measuring temperature: 25° C.
Measuring strain: 10%
Measurement mode: frequency sweep mode Measurement Example 3: Elongation Measurement The curable compositions of Examples and Comparative Examples were applied between the release-treated films and then cured under the same conditions as in the modulus measurement. Samples with a thickness of 1 mm were tailored into a size of 1.5 cm×5 cm and elongation was measured using TA-XT2 plus from Texture Technology, while pulling the joint portion up and down at a speed of 4.8 mm/min.

Measurement Example 4: Shear Strength Measurement

The curable compositions of Examples and Comparative Examples were applied to washed soda lime glasses (1T), covered with glasses, and cured under the same conditions as in the modulus measurement. The cured products were tailored to have a diameter of 1.5 cm and a thickness of 200 μm and circular samples were prepared, and then shear strength was measured using TA-XT 2 plus from Texture Technology, while pulling the joint portion up and down at a speed of 12.7 mm/min.

Measurement Example 5: Haze Measurement

The curable compositions of Examples and Comparative Examples were applied to soda lime glasses (1T) and cured under the same conditions as in the modulus measurement. The cured products were tailored to have a diameter of 5 cm and a thickness of 200 μm and circular samples were prepared, and then haze was measured in accordance with ASTM standard using NDH-5000 Haze meter from Nippon Denshoku.

Measurement Example 6: Y.I (Yellow Index) Measurement

After samples were prepared in the same manner as in the haze measurement, they were left at 105° C. for 1000 hours, and then Yellow Index (Y.I) was measured in accordance to ASTM standard using a COH400 transmittance meter from Nippon Denshoku.

Measurement Example 7: Evaluation of Adhesion Durability

The curable compositions of Examples and Comparative Examples were applied between glasses and cured under the same conditions as in the modulus measurement. The cured products were tailored to have a diameter of 1.5 cm and a thickness of 200 μm and circular samples were prepared, and then they were left at 105° C. for 1000 hours. The adhesive strength was measured using TA-XT2 plus from Texture Technology, while pulling the joint portion up and down at a speed of 12.7 mm/min. By comparing with the adhesive strengths before and after heat treatment, adhesion durability was determined according to the following evaluation criteria.

<Evaluation Criteria of Adhesion Durability>
O: no change in adhesive strength
Δ: decrease of adhesive strength
X: the cured product melts and flows down Production Example 1: Preparation of Monofunctional Silicone Oligomer (A1)

Apparatus
Thermometer, stirrer, water-cooled condenser, nitrogen gas
Preparation Method
350 g of polydimethylsiloxane diol of Formula A (Silaplane FM-4411, Chisso), 112 g of isophorone diisocyanate (isocyanate group content 37.8%) and 1 g of dibutyltin dilaurate were reacted in a flask at 60° C. for 5 hours. Next, 9.8 g of hydroxyethyl acrylate and 15.6 g of lauryl alcohol were added in drops and the reaction was continued as such, and the reaction was terminated when the isocyanate group disappeared.

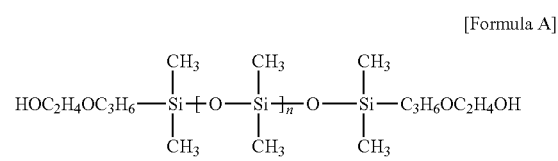

[Formula A]

Production Example 2: Preparation of Bifunctional Silicone Oligomer (A2)

Apparatus
Thermometer, stirrer, water-cooled condenser, nitrogen gas
Preparation Method
350 g of polydimethylsiloxane diol of Formula A (Silaplane FM-4411, Chisso), 102.7 g of isophorone diisocyanate (isocyanate group content 37.8%) and 1 g of dibutyltin dilaurate were reacted in a flask at 60° C. for 5 hours. Next, 4.9 g of hydroxyethyl acrylate, 6.1 g of hydroxybutyl acrylate and 7.4 g of lauryl alcohol were added in drops, and the reaction was continued as such, and the reaction was terminated when the isocyanate group disappeared.

Production Example 3: Preparation of Trifunctional Silicone Oligomer (A3)

Apparatus
Thermometer, stirrer, water-cooled condenser, nitrogen gas
Preparation Method
350 g of polydimethylsiloxane diol of Formula A (Silaplane FM-4411, Chisso), 276.7 g of isophorone diisocyanate-isocyanurate (isocyanate group content 17.0%) and 1 g of dibutyltin dilaurate were reacted in a flask at 60° C. For 5 hours. Next, 50.7 g of hydroxyethyl acrylate was added in drops and the reaction was continued as such, and the reaction was terminated when the isocyanate group disappeared.

Production Example 4: Non-Reactive Silicone Oligomer (B1)

Monohydroxylpolysiloxane (FM-0411, Chisso) of Formula B below was prepared as the non-reactive silicone oligomer (B1).

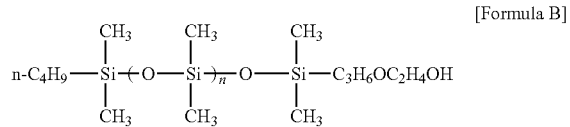

[Formula B]

Production Example 5: Non-Reactive Silicone Modified Acrylate Oligomer (B2)

Apparatus
Thermometer, stirrer, water-cooled condenser, nitrogen gas

Preparation Method
350 g of polydimethylsiloxane diol of Formula A (Silaplane FM-4411, Chisso), 124.4 g of isophorone diisocyanate (isocyanate group content 37.8%) and 1 g of dibutyltin dilaurate were reacted in a flask at 60° C. for 5 hours. Next, 52.2 g of lauryl alcohol was added in drops and the reaction was continued as such, and the reaction was terminated when the isocyanate group disappeared.

Production Example 6: Non-Reactive Silicone Modified Acrylate Oligomer (B3)

Apparatus
Thermometer, stirrer, water-cooled condenser, nitrogen gas

Preparation Method
350 g of polydimethylsiloxane diol of formula A (Silaplane FM-4411, Chisso), 112 g of isophorone diisocyanate (isocyanate group content: 37.8%) and 1 g of dibutyltin dilaurate were reacted in a flask at 60° C. for 5 hours. Next, 31.2 g of lauryl alcohol was added in drops and the reaction was continued as such, and the reaction was terminated when the isocyanate group disappeared.

Example 1

Preparation of Curable Composition
The curable composition of Example 1 was prepared by mixing a curable oligomer and a diluent to be 100 parts by weight and compounding an initiator (C1), a silane coupling agent (C2) and an antioxidant (C3) in a ratio of Table 1.

Examples 2 to 6 and Comparative Examples 1 to 6

The curable compositions were prepared in the same manner as in Example 1, except that on preparing the curable compositions, compounding ingredients and compositions were adjusted as shown in Table 1 below.

TABLE 1

| Unit (parts by weight) | | Example | | | | | | Comparative Example | | | | | |
|---|---|---|---|---|---|---|---|---|---|---|---|---|---|
| | | 1 | 2 | 3 | 4 | 5 | 6 | 1 | 2 | 3 | 4 | 5 | 6 |
| Curable oligomer | A1 | 50 | — | — | 20 | 20 | 20 | 10 | — | — | 10 | 10 | — |
| | A2 | 10 | 30 | 20 | 20 | 20 | 20 | 70 | 30 | — | 10 | 10 | 30 |
| | A3 | — | — | 10 | — | — | — | — | — | — | — | — | — |
| | A4 | — | — | — | — | — | — | — | — | 30 | — | — | — |
| Diluent | B1 | 40 | 70 | 70 | 60 | — | — | 20 | — | 70 | 80 | — | — |
| | B2 | — | — | — | — | 60 | — | — | — | — | — | — | — |
| | B3 | — | — | — | — | — | 60 | — | — | — | — | 80 | — |
| | B4 | — | — | — | — | — | — | — | — | — | — | — | 70 |
| | B5 | — | — | — | — | — | — | — | 70 | — | — | — | — |
| Additive | C1 | 5 | 5 | 5 | 5 | 5 | 5 | 5 | 5 | 5 | 5 | 5 | 5 |
| | C2 | 5 | 5 | 5 | 5 | 5 | 5 | 5 | 5 | 5 | 5 | 5 | 5 |
| | C3 | 1 | 1 | 1 | 1 | 1 | 1 | 1 | 1 | 1 | 1 | 1 | 1 |

A1: monofunctional silicone oligomer (Mw: 10,000)
A2: bifunctional silicone oligomer (Mw: 70,000)
A3: trifunctional silicone oligomer (Mw: 10,000)
A4: polyfunctional urethane acrylate oligomer (CN9014NS, Sartomer)
B1: non-reactive silicone oligomer (Mw: 10,000)
B2: non-reactive silicone modified urethane oligomer (Mw: 10,000)
B3: non-reactive silicone modified urethane oligomer (Mw: 40,000)
B4: non-reactive PDMS (Silicon rubber, C6-530, Dow Corning (Mw: 200,000)
B5: lauryl acrylate
C1: initiator (Irgacure 184, BASF)
C2: silane coupling agent (KBM-403, Shin-Etsu)
C3: antioxidant (Irganox 1010, BASF)

The evaluation results of physical properties of Examples and Comparative Examples were described in Tables 2 and 3 below.

TABLE 2

| | Example | | | | | |
|---|---|---|---|---|---|---|
| | 1 | 2 | 3 | 4 | 5 | 6 |
| Modulus ($\times 10^4$ Pa) | 1.3 | 3.1 | 3.9 | 2.8 | 2.9 | 2.7 |

TABLE 2-continued

| | Example | | | | | |
|---|---|---|---|---|---|---|
| | 1 | 2 | 3 | 4 | 5 | 6 |
| Viscosity ($\times 10^3$ cp) | 5.7 | 4.4 | 3.3 | 3.9 | 4.7 | 5.1 |
| Elongation (%) | 100 | 150 | 100 | 200 | 400 | 450 |
| Shear strength (N/cm$^2$) | 24 | 32 | 36 | 28 | 32 | 39 |
| Haze (%) | 0.31 | 0.23 | 0.24 | 0.27 | 0.25 | 0.23 |
| Y.I | 1.5 | 1.2 | 1.0 | 1.4 | 1.3 | 1.4 |
| Adhesion durability | ○ | ○ | ○ | ○ | ○ | ○ |

TABLE 3

| | Comparative Example | | | | | |
|---|---|---|---|---|---|---|
| | 1 | 2 | 3 | 4 | 5 | 6 |
| Modulus ($\times 10^4$ Pa) | 10.5 | 0.75 | 3.2 | 0.8 | 0.72 | 3.9 |
| Viscosity ($\times 10^3$ cp) | 13.5 | 1.0 | 8.9 | 2.7 | 3.6 | 15 |
| Elongation (%) | 50 | 50 | 100 | 150 | 150 | 400 |
| Shear strength (N/cm$^2$) | 44 | 29 | 30 | 12 | 10 | 38 |
| Haze (%) | 0.30 | 0.25 | 0.26 | 0.29 | 0.27 | 3.50 |
| Y.I | 3.0 | 2.5 | 2.6 | 1.7 | 1.6 | 2.4 |
| Adhesion durability | ○ | X | X | Δ | Δ | Δ |

DESCRIPTION OF SYMBOLS

10: spacer, 20: touch panel, 30: display panel, 40: cured product of curable composition

The invention claimed is:

1. A curable composition comprising 20 to 70 parts by weight of a polysiloxane-based urethane (meth) acrylate and 30 to 70 parts by weight of a non-reactive oligomer that has no (meth)acryl group, wherein said non-reactive oligomer is a non-reactive silicone oligomer or a non-reactive silicone modified urethane oligomer, and wherein said polysiloxane-based urethane (meth) acrylate is the reaction product of a hydroxyl group-containing polysiloxane, a polyfunctional isocyanate, and a hydroxyl group-containing (meth) acrylate.

2. The curable composition according to claim 1, wherein said hydroxyl group-containing polysiloxane is a compound represented by Formula 1 below:

[Formula 1]

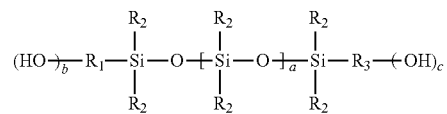

wherein, $R_1$ and $R_3$ are each independently a hydrocarbon group or an organic group containing a hetero atom or an ether group, each of $R_2$ is independently an alkyl group, a cycloalkyl group or a phenyl group, a is an integer of 10 or more, b and c are each independently an integer of 0 to 3, provided that the sum of b and c is 1 or more.

3. The curable composition according to claim 1, wherein said polysiloxane-based urethane (meth) acrylate comprises one which is bifunctional.

4. The curable composition according to claim 3, wherein said polysiloxane-based urethane (meth) acrylate further comprises one which is monofunctional or one which is trifunctional.

5. The curable composition according to claim 1, wherein said polysiloxane-based urethane (meth) acrylate has a weight average molecular weight (Mw) of 10,000 to 100,000.

6. The curable composition according to claim 1, wherein said non-reactive oligomer has a weight average molecular weight (Mw) of 10,000 to 50,000.

7. The curable composition according to claim 1, wherein said non-reactive silicone oligomer is a compound represented by Formula 2 below:

[Formula 2]

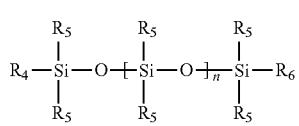

wherein, $R_4$ and $R_6$ are each independently a hydrocarbon group or an organic group containing a hetero atom or an ether group, each of $R_5$ is independently an alkyl group, a cycloalkyl group or a phenyl group, and n is an integer of 10 or more.

8. The curable composition according to claim 1, wherein said non-reactive silicone modified urethane oligomer is the reaction product of a hydroxyl group-containing polysiloxane, a polyfunctional isocyanate, and an alkyl group or a hydroxyl group-containing monomer.

9. The curable composition according to claim 8, wherein said hydroxyl group-containing polysiloxane is a compound represented by Formula 1 below:

[Formula 1]

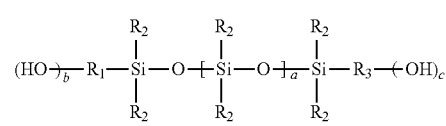

wherein, $R_1$ and $R_3$ are each independently a hydrocarbon group or an organic group containing a hetero atom, an ether group or a hydroxyl group, each of $R_2$ is independently an alkyl group, a cycloalkyl group or a phenyl group, a is an integer of 10 or more, b and c are each independently an integer of 0 to 3, provided that the sum of b and c is 1 or more.

10. The curable composition according to claim 1, wherein said curable composition after curing has an elastic modulus at 1 Hz of 10,000 Pa to 100,000 Pa, a shear strength of 20 N/cm$^2$ or more, and a haze of 1% or less.

11. The curable composition according to claim 1, wherein said curable composition has a viscosity at 1 Hz and 25° C. of 1,000 cp to 10,000 cp.

12. The curable composition according to claim 1, wherein said curable composition after curing and storage at 105° C. for 1000 hours has a yellow index value (Y.I) of 2.0 or less.

13. A filler for a display device comprising a cured product of a curable composition, wherein the curable composition comprising 20 to 70 parts by weight of a polysiloxane-based urethane (meth) acrylate and 30 to 70 parts by weight of a non-reactive oligomer that has no (meth)acryl group, wherein said non-reactive oligomer is a non-reactive silicone oligomer or a non-reactive silicone modified urethane oligomer.

* * * * *